(12) United States Patent
Shin et al.

(10) Patent No.: US 8,395,735 B2
(45) Date of Patent: Mar. 12, 2013

(54) LIQUID CRYSTAL DISPLAY DEVICE AND METHOD OF MANUFACTURING THE SAME

(75) Inventors: Yong-Hwan Shin, Yongin-si (KR); Kyoung-Tae Kim, Osan-si (KR); Jin-Soo Jung, Goyang-si (KR); Soo-Ryun Cho, Gunpo-si (KR)

(73) Assignee: Samsung Display Co., Ltd. (KR)

( * ) Notice: Subject to any disclaimer, the term of this patent is extended or adjusted under 35 U.S.C. 154(b) by 603 days.

(21) Appl. No.: 12/419,417

(22) Filed: Apr. 7, 2009

(65) Prior Publication Data
US 2010/0039596 A1    Feb. 18, 2010

(30) Foreign Application Priority Data

Aug. 12, 2008  (KR) .................................. 2008-78893

(51) Int. Cl.
*G02F 1/1333* (2006.01)
*G02F 1/1337* (2006.01)
*H01L 21/00* (2006.01)

(52) U.S. Cl. ........ 349/124; 349/123; 349/138; 349/158; 438/30

(58) Field of Classification Search .................. 349/124, 349/123, 138, 158; 438/30
See application file for complete search history.

(56) References Cited

U.S. PATENT DOCUMENTS

| 5,953,091 A * | 9/1999 | Jones et al. ................... 349/129 |
| 2002/0088984 A1* | 7/2002 | Toda et al. ...................... 257/99 |
| 2006/0102905 A1* | 5/2006 | Park ............................... 257/72 |

FOREIGN PATENT DOCUMENTS

| CN | 1356723 A | 7/2002 |
| JP | 10096929 | 4/1998 |
| JP | 11119227 A | 4/1999 |
| JP | 2006139253 A | 6/2006 |
| KR | 1020000003757 A | 1/2000 |

* cited by examiner

*Primary Examiner* — Brian Healy
*Assistant Examiner* — Jerry M Blevins
(74) *Attorney, Agent, or Firm* — Cantor Colburn LLP

(57) ABSTRACT

A liquid crystal display ("LCD") device includes a first substrate, a pixel electrode, a second substrate, a common electrode and an alignment layer. The first substrate includes a thin-film transistor ("TFT") and a plurality of pixel areas disposed on the first substrate. The pixel electrode is disposed on the TFT. The second substrate is disposed opposite to the first substrate. The common electrode is disposed on the second substrate. The alignment layer includes an insulation layer and a photoalignment layer, disposed on at least one of the pixel electrode and the common electrode.

19 Claims, 9 Drawing Sheets

LIQUID CRYSTAL DISPLAY DEVICE AND METHOD OF MANUFACTURING THE SAME

This application claims priority to Korean Patent Application No. 2008-78893, filed on Aug. 12, 2008, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD") device and a method of manufacturing the LCD device and, more particularly, to an LCD device having substantially reduced afterimages displayed thereon and a method of manufacturing the same.

2. Description of the Related Art

Generally, a liquid crystal display ("LCD") device includes a lower substrate, an upper substrate and a liquid crystal layer interposed therebetween. In the LCD device, liquid crystal molecules of the liquid crystal layer are arranged in response to a voltage difference between a common electrode of the upper substrate and a pixel electrode of the lower substrate. As a result, a light transmittance of the liquid crystal molecules is controlled to display an image on the LCD device.

A display panel for the LCD device includes the lower substrate and the upper substrate, disposed substantially opposite to each other, and the liquid crystal layer disposed therebetween. To accurately display the image, the arrangement of the liquid crystal molecules must be uniformly controlled. To this end, the display panel typically includes an alignment layer which aligns the liquid crystal molecules.

Recently, a pretilt angle of the alignment layer has been controlled to form a multi-domain structure in the display panel to increase a viewing angle of the display panel. Moreover, a photoalignment mode has been used to control the pretilt angle of the alignment layer. In the photoalignment mode, a photoreactor is disposed in the alignment layer by a photopolymerization reaction. The photopolymerization reaction is performed by irradiating ultraviolet light onto the alignment layer. However, a direct current ("DC") voltage is charged into the alignment layer by the photoreactor, since the photoreactor is dipolar. As a result, the LCD device displays undesirable afterimages due to the DC voltage.

BRIEF SUMMARY OF THE INVENTION

An exemplary embodiment of the present invention provides a liquid crystal display ("LCD") device having a substantially improved image display quality and/or substantially reduced afterimages.

Exemplary embodiments of the present invention also provide a method of manufacturing the LCD device.

In an exemplary embodiment of the present invention, an LCD device includes a first substrate, a pixel electrode, a second substrate, a common electrode and an alignment layer. The first substrate includes a thin-film transistor ("TFT") and a plurality of pixel areas disposed on the first substrate. The pixel electrode is disposed on the TFT. The second substrate is disposed opposite to, e.g., facing, the first substrate. The common electrode is disposed on the second substrate. The alignment layer includes an insulation layer and a photoalignment layer disposed on at least one of the pixel electrode and the common electrode.

In an exemplary embodiment, the photoalignment layer includes a base layer contacting the insulation layer and a photoreactor protruding from the base layer.

In an alternative exemplary embodiment of the present invention, an LCD device includes a first substrate, a second substrate and a liquid crystal layer. The first substrate includes a TFT, a pixel electrode electrically connected to the TFT and a first alignment layer having an insulation layer disposed on the pixel electrode and a photoalignment layer having a thickness less than a thickness of the insulation layer. The second substrate includes a common electrode disposed opposite to, e.g., facing, the pixel electrode and a second alignment layer including an insulation layer disposed on the common electrode and a photoalignment layer having a thickness smaller than the thickness of the insulation layer. The liquid crystal layer is disposed between the first substrate and the second substrate, and includes liquid crystal molecules. Alignment directions of the liquid crystal molecules are controlled by the first alignment layer and the second alignment layer.

In another alternative exemplary embodiment of the present invention, a method of manufacturing an LCD device includes: forming a first substrate including a thin-film transistor and a pixel electrode disposed on the thin-film transistor and a plurality of pixel areas disposed on the first substrate; forming a second substrate opposite to the pixel electrode of the first substrate, the second substrate including a common electrode; and forming an alignment layer on at least one of the pixel electrode and the common electrode, the alignment layer including an insulation layer and a photoalignment layer.

Thus, according to exemplary embodiments of the present invention, a display panel includes an alignment layer having a double-layer structure including an insulation layer and a photoalignment layer, and a thickness of the photoalignment layer is thereby substantially decreased. Thus, a total quantity of photoreactors, which are a substantial cause of charging of a direct current (DC) voltage, are substantially decreased, thereby preventing and or effectively eliminating afterimages caused by the charging of the DC voltage.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
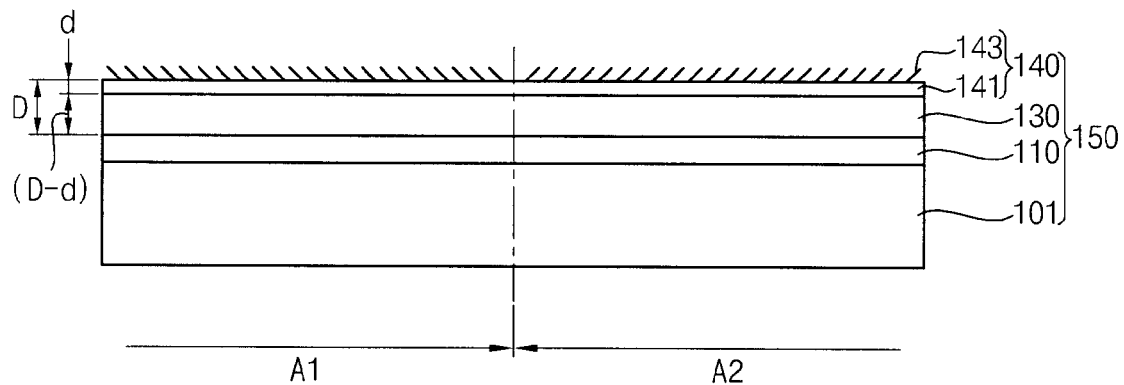
FIG. 1 is a partial cross-sectional view illustrating an exemplary embodiment of a substrate for a liquid crystal display ("LCD") according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

FIG. 1 is a partial cross-sectional view illustrating an exemplary embodiment of a substrate for a liquid crystal display ("LCD") device according to the present invention.

Referring to FIG. 1, the substrate for the LCD device according to an exemplary embodiment includes an insulation substrate 101, an electrode 110 and an alignment layer 150.

The electrode 110 is disposed on the insulation substrate 101, and includes a transparent conductive material or a metal material, for example, but alternative exemplary embodiments are not limited thereto.

The alignment layer 150 is disposed on the electrode 110, and includes an insulation layer 130 and a photoalignment layer 140. The insulation layer 130 is disposed on the electrode 110, and the photoalignment layer 140 is disposed on the insulation layer 130. In an exemplary embodiment, the insulation layer 130 is disposed directly on the electrode 110, and the photoalignment layer 140 is disposed directly on the insulation layer 130. The photoalignment layer 140 includes a base layer 141 disposed on the insulation layer 130, and a plurality of photoreactors 143 disposed on the base layer 141. Photoreactors 143 of the plurality of photoreactors 143 are tilted, e.g., are aligned, corresponding to an irradiating direction of an ultraviolet light, and protrude from the base layer 141, a shown in FIG. 1. Thus, a first region A1 and a second region A2, e.g., a first domain A1 and a second domain A2, may be formed on the substrate 101 based on an irradiating direction of the ultraviolet light, as described in further detail below. The insulation layer 130 according to an exemplary embodiment includes silicon oxide ("SiOx") or silicon nitride ("SiNx"), for example. When the insulation layer comprises the silicon oxide ("SiOx") or silicon nitride ("SiNx"), the insulation layer may be increasingly capable of blocking outgassing generated from a lower layer. Therefore, an impurity density of a liquid crystal layer may be decreased so that line or surface afterimages may be decreased.

The photoalignment layer 140 according to an exemplary embodiment may include a polymer material, such as polyimide, polyamic acid, polyvinyl cinnamate, polyazobenzene, polyethyleneimine, polyvinyl alcohol, polyamide, polyethylene, polystyrene, polyphenylene phthalamide, polyester, polyurethane and/or polymethyl methacrylate, for example, but alternative exemplary embodiments of the present invention are not limited thereto. In an exemplary embodiment, the alignment layer 150 has a first thickness D, the photoalignment layer 140 has a second thickness d, and the insulation layer 130 has a third thickness (D−d). The second thickness d may be preferably less than the third thickness (D−d). Additionally, the second thickness d may be the same as the third thickness (D−d), or the different from the third thickness (D−d).

A normal alignment layer having a single-layer structure has a thickness of about 800 Å so that the alignment layer 150 having a double-layer structure may have the thickness D of about 500 Å to about 2,000 Å. Additionally, a thickness ratio (d:D−d) of the photoalignment layer 140 and the insulation layer 130 may be about 5:95 to about 95:5 so that alignment layer 150 may have substantially the same capacitance and resistance as the normal alignment layer. The thickness ratio may preferably be about 50:50 for a manufacturing process.

The photoreactors 143 are adsorbed to the liquid crystal molecules and/or to the electrode 110 to have a polarity of the liquid crystal molecules and/or the electrode 110, respectively. In an alternative exemplary embodiment, the photoreactors 143 are dipolar. Thus, the photoreactors 143 charge a direct current ("DC") voltage. In an exemplary embodiment, a required quantity of the photoreactors 143 is substantially reduced to thereby effectively prevent a charging of the DC voltage into the photoreactors 143, substantially reducing and/or effectively preventing afterimages displayed on the LCD device according to an exemplary embodiment.

In an exemplary embodiment of the present invention, the alignment layer 150 has the double-layer structure including an insulation layer 130 and a photoalignment layer 140. Moreover, a thickness of the photoalignment layer 140 is substantially reduced. When the thickness of the photoalignment layer 140 is reduced, the quantity of the photoreactors 143 required is further reduced. As a result, the amount of the DC voltage charged in the photoreactors 143 is also further decreased. Thus, afterimages caused by the charging of the DC voltage are further reduced and/or effectively prevented.

Figure 2A:
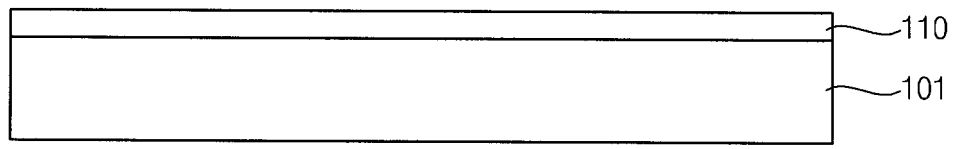
FIGS. 2A to 2D are partial cross-sectional views illustrating an exemplary embodiment of a method of manufacturing a substrate for the LCD device shown in FIG. 1.
Figure 2B:
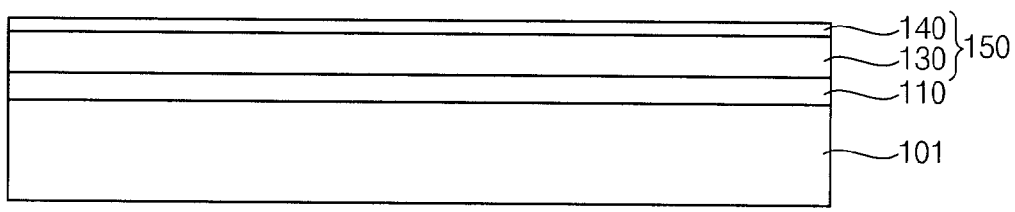
Figure 2C:
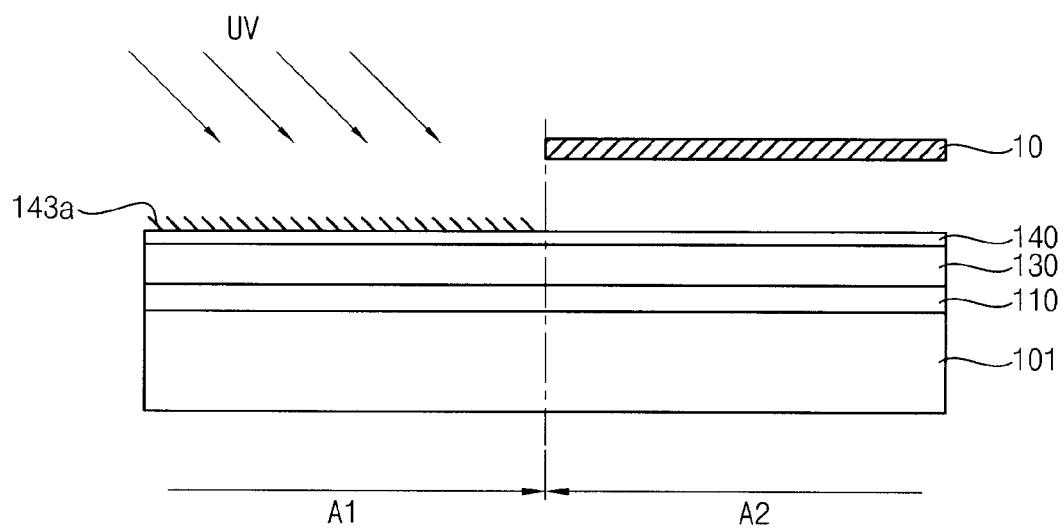

FIGS. 2A to 2C are partial cross-sectional views illustrating an exemplary embodiment of a method of manufacturing a substrate for the LCD device shown in FIG. 1.

Referring to FIGS. 1 and 2A, the electrode 110 is formed on the insulation substrate 101. The electrode 110 according to an exemplary embodiment includes a transparent conductive material and/or a metal material, for example, but alternative exemplary embodiments of the present invention are not limited thereto. For example, the transparent conductive material according to an exemplary embodiment may include indium tin oxide ("ITO") or indium zinc oxide ("IZO"), but alternative exemplary embodiments are not limited thereto. In addition, the metal material may include Mo, MoN, MoNb, Mo alloy, Cu, Cu alloy, CuMo alloy, Al, Al alloy, Ag and/or Ag alloy, for example.

Referring now to FIGS. 1 and 2B, the insulation layer 130 is formed on the insulation substrate 101 having the electrode 110 formed thereon. The insulation layer 130 according to an exemplary embodiment includes silicon oxide ("SiOx") or silicon nitride ("SiNx"), for example. The insulation layer 130 has a predetermined thickness with regard to the thickness D, e.g., the first thickness, (FIG. 1) of the alignment layer 150 and the thickness d, e.g., the second thickness, (FIG. 1) of the photoalignment layer 140. Specifically, the predetermined thickness of the insulation layer 130 according to an exemplary embodiment is the difference (D−d) between the thickness D of the alignment layer 150 and the thickness d, e.g., the third thickness, of the photoalignment layer 140.

For example, when the thickness D of the alignment layer 150 is 900 Å, the thickness (D−d) of the insulation layer 130 is 800 Å and the thickness d of the photoalignment layer 140 is 100 Å. Thus, the thickness d of the photoalignment layer 140 has a minimum required for forming the photoreactors 143. When the thickness (D−d) of the insulation layer 130 is 700 Å, 600 Å, or 500 Å, the thickness d of the photoalignment layer 140 is 200 Å, 300 Å or 400 Å, respectively.

Thus, the photoalignment layer is formed to have a small thickness, a capacitance of the photoalignment layer 140 thereby increases and a resistance of the photoalignment layer 140 thereby decreases. Therefore, the insulation layer 160 according to an exemplary embodiment compensates for the increased capacitance and the decreased resistance of the photoalignment layer 140. For example, the capacitance and the resistance of the alignment layer 150 of the double-layer structure having a thickness of 900 Å is substantially the same as the capacitance and the resistance of the alignment layer 150 of a single-layer structure having a thickness of 900 Å.

Referring to FIGS. 1 and 2C, a mask 10 is disposed on the insulation substrate 101 having the alignment layer 150 formed thereon.

As described above, the alignment layer 150 includes the double-layer structure including the insulation layer 130 and the photoalignment layer 140. Further, ultraviolet light UV is irradiated onto the alignment layer 150 using the mask 10. In an exemplary embodiment, the ultraviolet light UV may be polarized ultraviolet light UV. When the polarized ultraviolet light UV is irradiated onto the first alignment layer 150, the photoreactors 143 are formed in the photoalignment layer 140 by a photopolymerization reaction. During the photopolymerization reaction, the photoalignment layer 140 includes the base layer 141 and the photoreactors 143 which protrude from the base layer 141. The photoreactors 143 have a directionality, e.g., an alignment direction, corresponding to a direction in which the polarized ultraviolet light UV is irradiated onto the alignment layer 150.

In an exemplary embodiment, for example, the alignment layer 150 is divided into the first domain A1 and the second domain A2. After the second domain A2 is covered by the mask 10, the ultraviolet light UV is irradiated onto the alignment layer 150 in a first direction. The ultraviolet light UV is irradiated to the first domain A1 of the photoalignment layer 140 which is exposed by the mask 10 and thereby causes the photopolymerization reaction of first photoreactors 143a in the first domain A1 of the photoalignment layer 140. Therefore, the first photoreactors 143a in the first domain A1 of the photoalignment member 140 are inclined along a first direction when the ultraviolet light is irradiated to the first domain A1 of the photoalignment member 140. As a result, the first photoreactors 143a protrude from base layer 141 in the first direction.

Figure 2D:
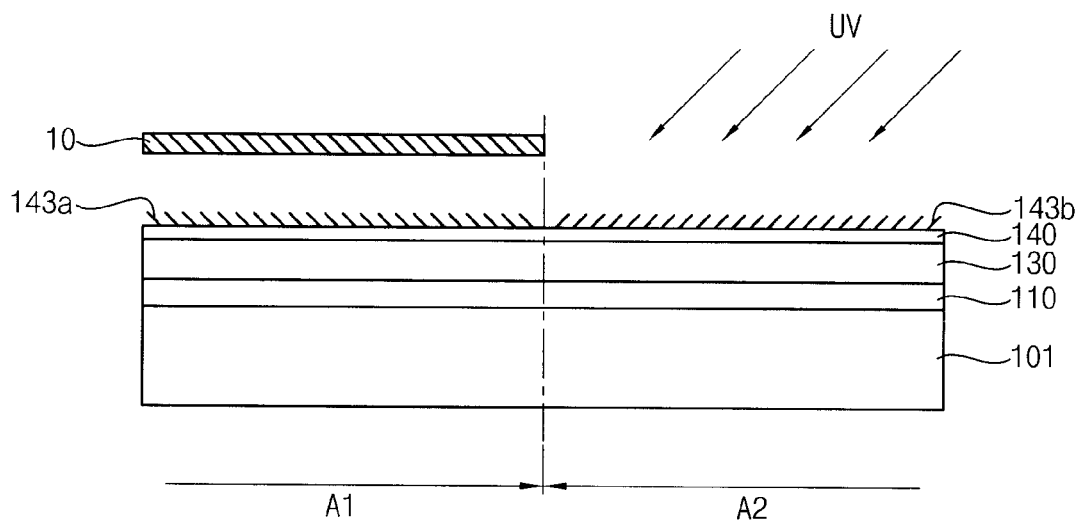

Referring to FIGS. 1 and 2D, after the first domain A1 is covered by the mask 10, the ultraviolet light UV is irradiated onto the alignment layer 150 in a second direction different from the first direction. Thus, the ultraviolet light UV is irradiated onto the second domain A2 of the photoalignment layer 140 which is exposed by the mask 10, and thereby causes the photopolymerization reaction of second photoreactors 143b in the second domain A2 of the photoalignment layer 140. Therefore, the second photoreactors 143b in the second domain A2 of the photoalignment member 140 are inclined along the second direction when the ultraviolet light UV is irradiated onto the second domain A2 of the photoalignment member 140. Therefore, the second photoreactors 143b protrude from base layer 141 in the second direction.

As a result, the alignment layer 150 includes two regions. In an alternative exemplary embodiment, however, the alignment layer 150 may include more than two regions divided by a method substantially the same as or similar to the method described above. Thus, the alignment layer 150 according to an alternative exemplary embodiment includes a plurality of regions corresponding to the photoreactors 143 having different directionalities, e.g., alignment directions, from each other. Therefore, a direction in which the liquid crystal molecules are aligned is changed according to the regions of the alignment layer 150. As a result, a viewing angle of the display panel is substantially increased.

Figure 3:
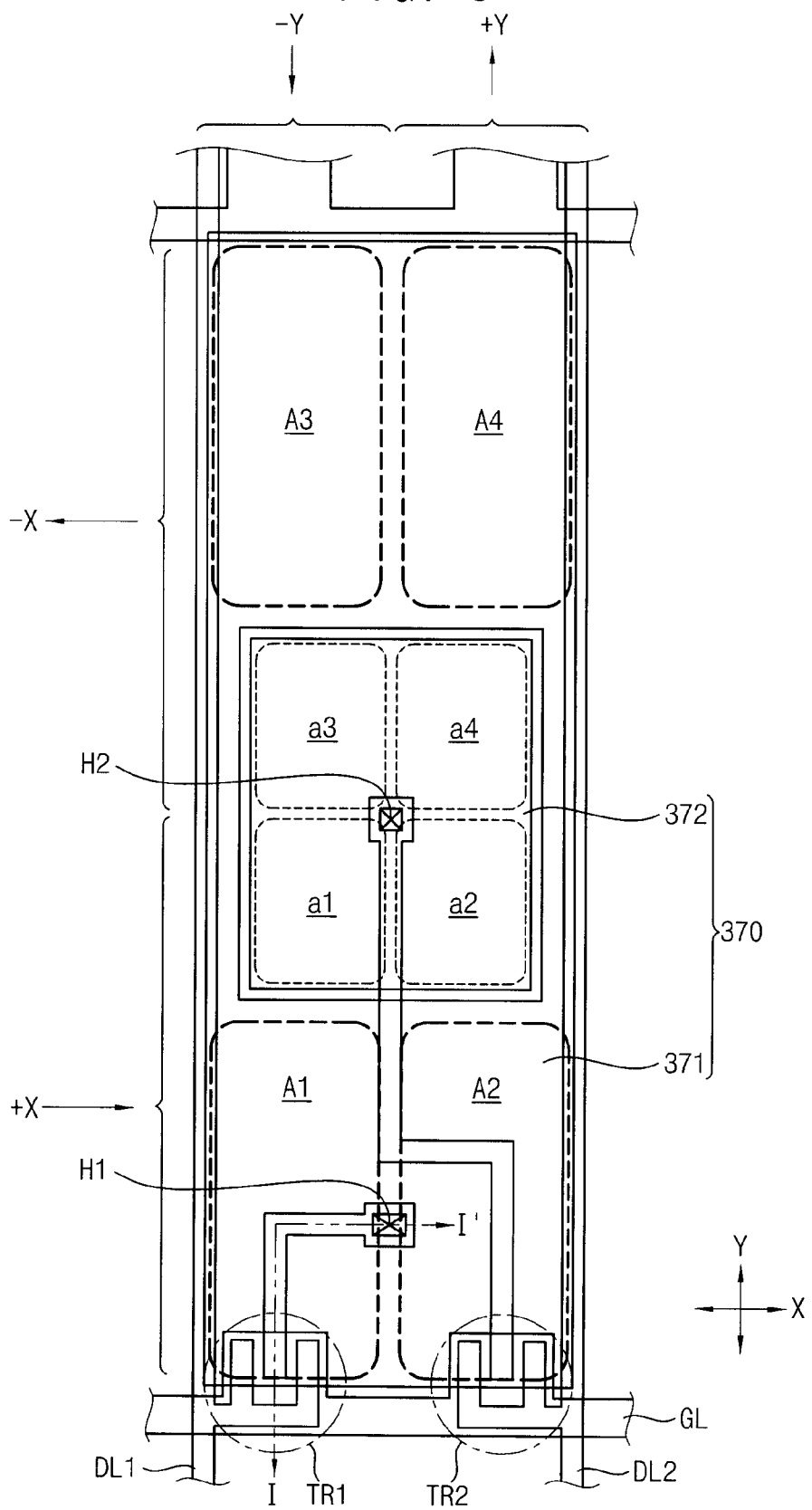
FIG. 3 is a partial cross-sectional view illustrating an alternative exemplary embodiment of a substrate for an LCD device according to the present invention.
Figure 4:
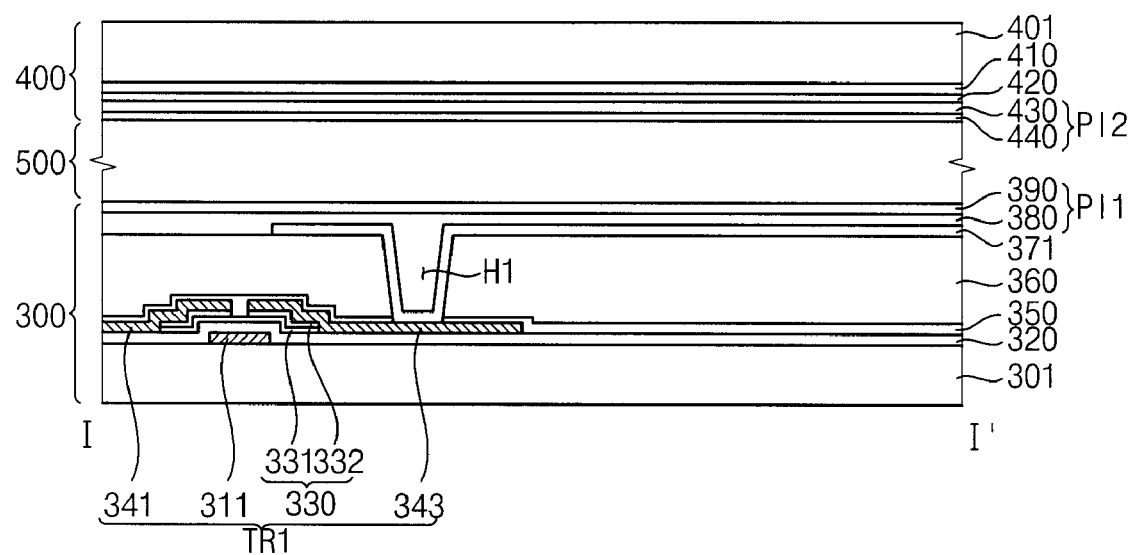
FIG. 4 is a partial cross-sectional view taken along line I-I' of FIG. 3.

FIG. 3 is a partial cross-sectional view illustrating an alternative exemplary embodiment of a substrate for an LCD device according to the present invention. FIG. 4 is a partial cross-sectional view taken along line I-I' of FIG. 3.

Referring to FIGS. 3 and 4, the LCD device according to an exemplary embodiment of the present invention includes a first substrate 300, a second substrate 400 and a liquid crystal layer 500.

The first substrate 300 includes a first insulation substrate 301, an array layer AL (FIG. 5B), an organic layer 360, a pixel electrode 370 and a first alignment layer PI1. The pixel electrode 370 includes a first sub-pixel electrode 371 and a second sub-pixel electrode 372 spaced apart from the first sub-pixel electrode 371.

The first insulation substrate 301 includes a transparent material such as a transparent glass, for example. In an exemplary embodiment, the first insulation substrate 301 defines a plurality of pixel areas, corresponding to a plurality of pixels, to display an image on the LCD device.

The array layer AL is disposed on the first insulation substrate 301. The array layer AL includes a gate line GL extending in an X direction, e.g., a substantially horizontal direction, a plurality of data lines DL including a first data line DL1 and a second data line DL2 extending in a Y direction, e.g., a substantially vertical direction, crossing the X direction, a first thin-film transistor ("TFT") TR1 and a second TFT TR2. The first TFT TR1 is connected to the gate line GL and the first data line DL1. The second TFT TR2 is connected to the gate line GL and the second data line DL2.

Moreover, the first TFT TR1 includes a gate electrode 311 electrically connected to the gate line GL, a source electrode 341 electrically connected to the first data line DL1 and a drain electrode 343 electrically connected to the first sub-pixel electrode 371. The first TFT TR1 includes a semiconductor layer 330 disposed on the gate electrode 311. In addition, the semiconductor layer 330 includes an active layer 331 doped with impurities and an ohmic contact layer 332 disposed on the active layer 331. The source electrode 341 and the drain electrode 343 are disposed on the semiconductor layer 330, and the source electrode 341 is spaced apart from the drain electrode 343, as shown in FIG. 4.

The second TFT TR2 has substantially the same elements as the first TFT TR1, but is electrically connected to the second sub-pixel electrode 372.

The array layer AL further includes a gate insulation layer 320 and a protective layer 350. The gate insulation layer 3 covers at least a portion of the gate line GL and the gate electrode 311 connected to the gate electrode 311. The protective layer 350 also covers at least a portion of each of the first data line DL1 and the second data line DL2, the source electrode 341 connected to the first data line DL1, and the drain electrode 343 spaced apart from the source electrode 341.

The organic layer 360 is disposed on the array layer AL. More particularly, the organic layer 360 is disposed on the first insulation substrate 301 having the array layer AL formed thereon to flatten, e.g., to planarize, the first insulation substrate 301. The organic layer 360 is disposed between the array layer AL and the pixel electrode 370. In an exemplary embodiment, the organic layer 360 is a relatively thick layer, compared to other layers, and a capacitance between the lines of the array layer AL and the pixel electrode 370 is thereby substantially decreased. Thus, an end portion of the pixel electrode 370 overlaps with the lines and an aperture ratio of the LCD device is thereby substantially improved.

The pixel electrode 370 according to an exemplary embodiment includes a transparent conductive material, for example. Additionally, the pixel electrode 370 is disposed in the pixel area of the first insulation substrate 301. The pixel electrode 370 is connected to the first TFT TR1 and the second TFT TR2 through a first contact hole H1 and a second contact hole H2 formed in the organic layer 360 and the protective layer 350.

In an exemplary embodiment, the first sub-pixel electrode 371 is electrically connected to the first TFT TR1 to receive a high level pixel voltage, and the second sub-pixel electrode 372 is electrically connected to the second TFT TR2 to receive a low level pixel voltage, but alternative exemplary embodiments are not limited thereto. Thus, the pixel area is divided by the first sub-pixel electrode 371 and the second sub-pixel electrode 372 into two domains which receive pixel voltages having different levels from each other.

The first alignment layer PI1 is disposed on the first insulation substrate 301 on which the pixel electrode 370 is formed. The first alignment layer PI1 includes an insulation layer 380 and a photoalignment layer 390. The photoalignment layer 390 has a thickness which is less than a thickness of the insulation layer 380. In an exemplary embodiment, a plurality of photoreactors 143 is disposed in the photoalignment layer 390, and photoreactors 143 of the plurality of photoreactors 143 are formed by a photopolymerization reaction. The liquid crystal layer 500 is aligned in a multi-domain structure according to tilt angles of the photoreactors 143 which have different directionalities, e.g., alignment directions, from each other.

In an exemplary embodiment, for example, the photoalignment layer 390 on which the first sub-pixel electrode 371 is formed has photoreactors 143 having different directionalities from each other. Moreover, the pixel area in which the first sub-pixel electrode 371 is formed may be divided into first, second, third and fourth regions A1, A2, A3 and A4, respectively. In addition, the photoalignment layer 390 on which the second sub-pixel electrode 372 is formed has photoreactors 143 having different directionalities from each other. The pixel area in which the second sub-pixel electrode 372 is formed is divided into first, second, third and fourth regions a1, a2, a3 and a4, respectively. Therefore, the pixel area in which the first sub-pixel electrode 371 and the second sub-pixel electrode 372 are disposed is divided into eight regions A1, A2, A3, A4, a1, a2, a3 and a4.

The first alignment layer PI1 has a first rubbing direction. More specifically, the first rubbing direction is in a +Y direction corresponding to a left region of the pixel area and a −Y direction corresponding to a right region of the pixel area, as shown in FIG. 3.

The second substrate 400 includes a second insulation substrate 401, a color filter 410, a common electrode 420 and a second alignment layer PI2.

The second insulation substrate 401 includes a transparent material such as a transparent glass, but alternative exemplary embodiments are not limited thereto. In an exemplary embodiment, the second insulation substrate 401 includes a plurality of pixel areas corresponding to a plurality of pixels which display an image on the LCD device.

The color filter 410 is disposed on the second insulation substrate 401 substantially corresponding to an area on which the pixel electrode 370 is disposed. As shown in FIG. 3, the color filter 410 is disposed on the second insulation substrate 401, but in an alternative exemplary embodiment of the present invention, the color filter 410 may be disposed on the first substrate 300 instead of on the organic layer 360.

The common electrode 420 is disposed on the second insulation substrate 401 having the color filter 410 disposed thereon. In an exemplary embodiment, the common electrode 420 covers an entire area of the second insulation substrate 401. The common electrode 420 is disposed opposite to the pixel electrode 370 of the first substrate 300 to define a liquid crystal capacitor therebetween. The liquid crystal layer 500 disposed between the common electrode 420 and the pixel electrode 370 is aligned by a common voltage Vcom (FIG. 7), received by the common electrode 420, and a data voltage Vdata (FIG. 7), received to the pixel electrode 370.

The second alignment layer PI2 is disposed on the second insulation substrate 401 having the common electrode 420 formed thereon. In an exemplary embodiment, the second alignment layer PI2 includes an insulation layer 430 and a photoalignment layer 440. In an exemplary embodiment, the photoalignment layer 440 has a thickness less than a thickness of the insulation layer 430. A plurality of photoreactors 143 is disposed in the photoalignment layer 440, and photoreactors 143 of the plurality of photoreactors 143 are formed by the photopolymerization reaction. Thus, the liquid crystal layer 500 is aligned in a multi-domain structure according to tilt angles of the photoreactors 143 having different directionalities, e.g., alignment directions, from each other.

The second alignment layer PI2 according to an exemplary embodiment has a second rubbing direction. Specifically, the second rubbing direction has a −Y direction, corresponding to an upper region of the pixel area, and a +X direction, corresponding to a lower region of the pixel area, as shown in FIG. 3.

Thus, the liquid crystal layer 500 of the LCD device according to an exemplary embodiment is pretilted by the first alignment layer PI1 of the first substrate 300 and the second alignment layer PI2 of the second substrate 400. In addition, the liquid crystal layer 500 is aligned by an electric field formed between the pixel electrode 370 and the common electrode 420. A grayscale image is displayed by light transmitted through the liquid crystal layer 500 aligned by the electric field.

FIGS. 5A to 5E are partial cross-sectional views illustrating an exemplary embodiment of a method of manufacturing a first substrate of the substrate shown in FIG. 4.

Figure 5A:
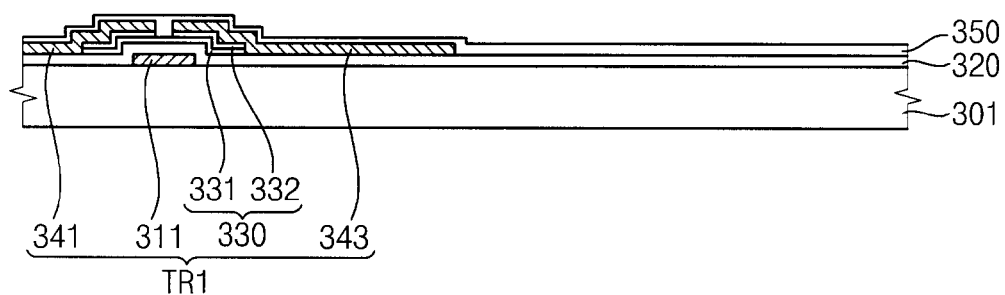
FIGS. 5A to 5E are partial cross-sectional views illustrating an exemplary embodiment of a method of manufacturing a first substrate of the substrate shown in FIG. 4.

Referring to FIGS. 4 and 5A, the array layer AL is formed on the first insulation substrate 301.

A gate metal pattern (not fully shown) including the gate line GL and the gate electrode 311 are disposed on the first insulation substrate 301. The gate metal pattern may further include a storage common electrode facing the pixel electrode 370 and defining a storage capacitor therebetween.

A gate insulation layer 320 is formed on the first insulation substrate 301 having the gate metal pattern formed thereon. A semiconductor layer 330 is formed on the first insulation substrate 301 having the gate insulation layer 320 formed thereon. In an exemplary embodiment, the semiconductor layer 330 is formed in an area in which the gate electrode 311 is formed.

A source metal pattern (not fully shown) is formed on the first insulation substrate 101 having the semiconductor layer 330 formed thereon. The source metal pattern includes the first data line DL1 and the second data line DL2, the source electrode 341, and the drain electrode 343.

A protective layer 350 is formed on the first insulation substrate 301 having the source metal pattern formed thereon.

Figure 5B:
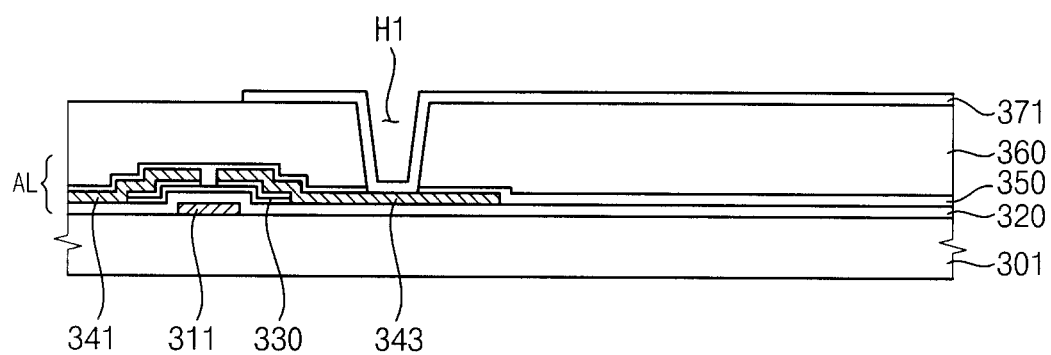

Referring to FIGS. 4 and 5B, the organic layer 360 is formed on the first insulation substrate 301 having the protective layer 350 formed thereon. The organic layer 360 is thicker than other layers and has an aperture through which the protective layer 350 is exposed in an area corresponding to an end portion of the drain electrode 343. More specifically, the protective layer 350 is exposed by etching to form a first contact hole H1 through which the drain electrode 343 of the first TFT TR1 is exposed. The protective layer 350, exposed by the opening, is etched to form a second contact hole H2 which exposes the drain electrode (not shown) of the second TFT TR2.

A pixel electrode 370 including the first sub-pixel electrode 371 and the second sub-pixel 372 is formed on the first insulation substrate 301 having the first contact hole H1 and the second contact hole H2 therethrough by using a transparent conductive material, for example. The first sub-pixel electrode 371 contacts the drain electrode 343 through the first contact hole H1.

Figure 5C:
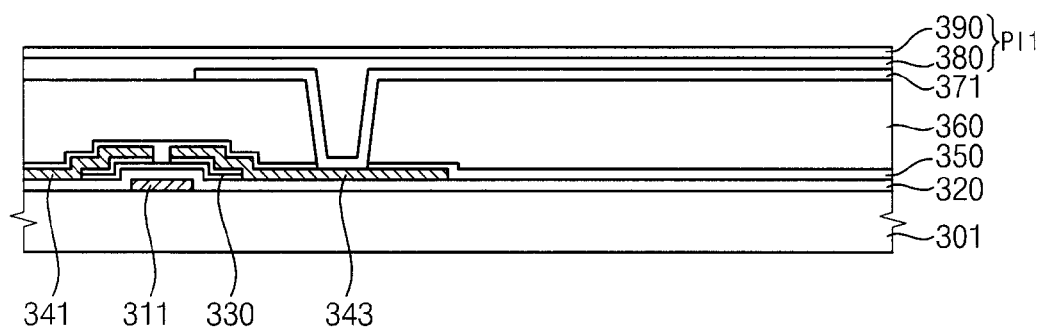

Referring to FIGS. 4 and 5C, the first alignment layer PI1 having the first thickness D is formed on the first insulation substrate 301 having the pixel electrode 370 formed thereon. The first alignment layer PI1 includes an insulation layer 380 and a photoalignment layer 390. The insulation layer 380 having the third thickness (D−d) is formed on the first insulation substrate 301 having the pixel electrode 370 formed thereon. The photoalignment layer 390 having a second thickness d is formed on the first insulation substrate 301 having the insulation layer 380 formed thereon. The second thickness d is smaller than the third thickness (D−d).

When the thickness of the first alignment layer PI1 is about 900 Å, for example, the thickness of the insulation layer 380 is about 800 Å and the thickness of the photoalignment layer 390 is, for example, about 100 Å. Alternatively, when the thickness of the insulation layer 380 is about 700 Å, 600 Å or 500 Å, the thickness of the photoalignment layer 390 is about 200 Å, 300 Å or 400 Å, respectively.

In an exemplary embodiment of the present invention, the first alignment layer PI1 has a double-layer structure including the insulation layer 380 and the photoalignment layer 390 and the thickness of the photoalignment layer 390 is thereby substantially reduced. When the thickness of the photoalignment layer 390 is reduced, a total quantity of required photoreactors 143 is reduced. When the total quantity of the photoreactors 143 is reduced, an amount of DC voltage in the photoreactors 143 is decreased. Therefore, afterimages, caused by charging of the DC voltage, is substantially reduced and/or effectively prevented.

The photoalignment layer 380 according to an exemplary embodiment may include a polymer material, such as polyimide, polyamic acid, polyvinyl cinnamate, polyazobenzene, polyethyleneimine, polyvinyl alcohol, polyamide, polyethylene, polystyrene, polyphenylene phthalamide, polyester, polyurethane and/or polymethyl methacrylate, for example, but alternative exemplary embodiments of the present invention are not limited thereto.

Figure 5D:
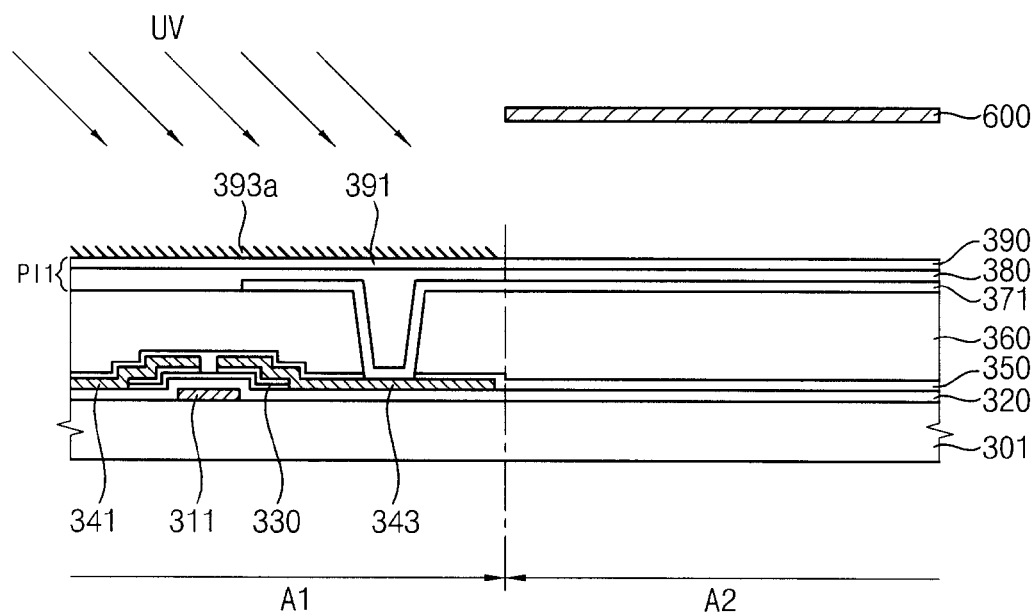

Referring to FIGS. 4 and 5D, the first alignment layer PI1 separates a first region A1 from a second region A2. Therefore, after the second region A2 is covered by a mask 600, ultraviolet light UV is irradiated onto the first alignment layer PI1 in a first direction. Specifically, the ultraviolet light UV is irradiated onto the first region A1 of the photoalignment layer 390 exposed by the mask 600 and therefore causes a photopolymerization reaction of a first photoreactor 393a protruding from the base layer 391 in the first direction.

Figure 5E:
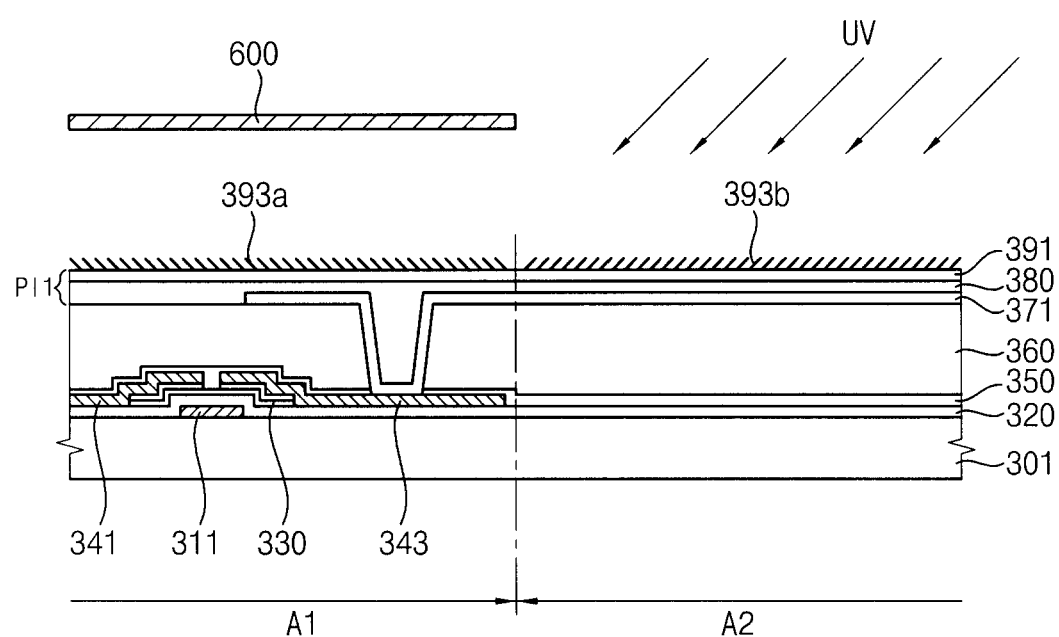

Referring to FIGS. 4 and 5E, after the first region A1 is covered by the mask 600, ultraviolet light UV is irradiated on to the first alignment layer PI1 in a second direction different from the first direction. The ultraviolet light is irradiated to the second region A2 of the photoalignment layer 390 exposed by the mask 600 and thereby causes the photopolymerization reaction of a second photoreactor 393b protruding from the base layer 391 in the second direction. In an exemplary embodiment of the present invention, although the first alignment layer PI1 includes two regions, the first alignment layer PI1 according to an alternative exemplary embodiment may include more than two regions, divided by a method substantially the same as or similar to the method described herein.

Therefore, the first alignment layer PI1 includes the double-layer structure so that the photoalignment layer 390 may be formed to have a small thickness. Thus, the total quantity of the photoreactors that are the main cause of charging of the DC voltage may be decreased to prevent the afterimages caused by the charging of the DC voltage.

Figure 6A:
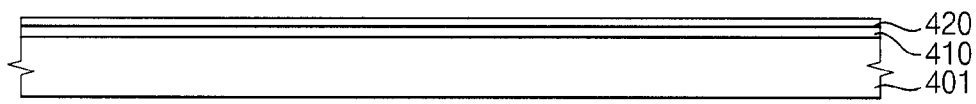
FIGS. 6A to 6C are partial cross-sectional views illustrating an exemplary embodiment of a method of manufacturing a second substrate of the substrate shown in FIG. 4.
Figure 6B:
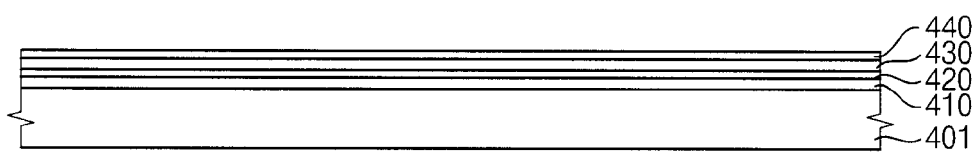
Figure 6C:
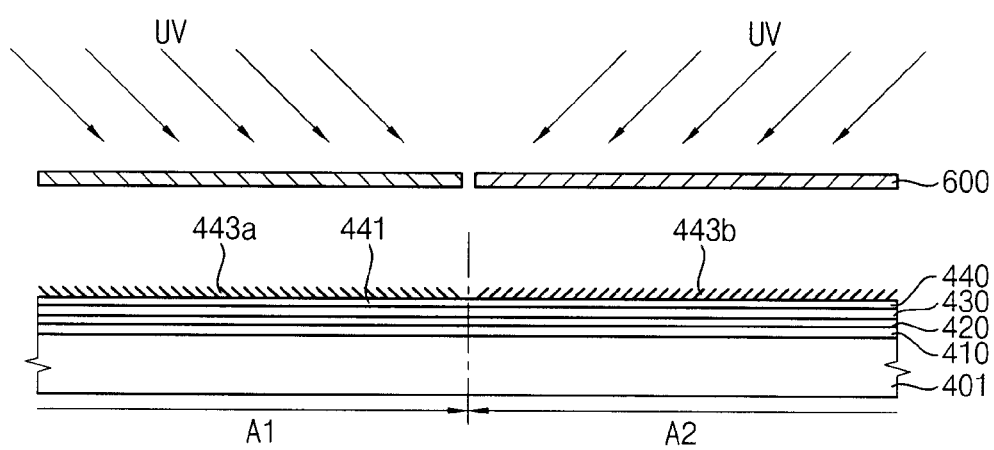

FIGS. 6A to 6C are partial cross-sectional views illustrating an exemplary embodiment of a method of manufacturing a second substrate of the substrate shown in FIG. 4.

Referring to FIGS. 4 and 6A, the color filter 410 is formed on the second insulation substrate 401. The common electrode 420 is formed on the second insulation substrate 401 having the color 410 formed on thereon.

Referring to FIGS. 4 and 6B, the second alignment layer PI2 having the first thickness D is formed on the second insulation substrate 401 having the common electrode 420 formed thereon. The second alignment layer PI2 includes an insulation layer 430 and a photoalignment layer 440. The insulation layer 430 is formed on the second insulation substrate 401 having the common electrode 420 formed thereon with a third thickness (D–d). The photoalignment layer 440 is formed on the second insulation substrate 401 having the insulation layer 430 formed thereon into a second thickness d less than the third thickness (D–d).

For example, in an exemplary embodiment wherein the thickness of the second alignment layer PI2 is about 900 Å, the thickness of the insulation layer 430 is about 800 Å and the thickness of the photoalignment layer 440 is, for example, about 100 Å. Alternatively, when the thickness of the insulation layer 430 is about 700 Å, 600 Å or 500 Å, the thickness of the photoalignment layer 440 is about 200 Å, 300 Å or 400 Å, respectively.

In an exemplary embodiment of the present invention, the second alignment layer PI2 includes the double-layer structure having the insulation layer 430 and the photoalignment layer 440, so that the thickness of the photoalignment layer 440 is substantially reduced. Thus, the total quantity of the photoreactors 143 formed by the photopolymerization reaction is substantially reduced, and the amount of the DC voltage charged in the photoreactors 143 may be decreased. Afterimages caused by the charging of the DC voltage into the photoreactors 143 are thereby effectively prevented.

The photoalignment layer 440 according to an exemplary embodiment includes a polymer material, such as polyimide, polyamic acid, polyvinyl cinnamate, polyazobenzene, polyethyleneimine, polyvinyl alcohol, polyamide, polyethylene, polystyrene, polyphenylene phthalamide, polyester, polyurethane or polymethyl methacrylate, for example.

Referring to FIGS. 4 and 6C, the second alignment layer PI2 divides a first region A1 from a second region A2. Then, after the second region A2 is covered by the mask 600, for example, ultraviolet light UV is irradiated onto the second alignment layer PI2 in a first direction. The ultraviolet light UV is irradiated onto the first region A1 of the photoalignment layer 440 exposed by the mask 600 and thereafter causes the photopolymerization reaction of first photoreactors 443a protruding from the base layer 441 in the first direction.

After the first region A1 is covered by the mask 600, ultraviolet light UV is irradiated onto the second alignment layer PI2 in a second direction different from the first direction. More specifically, the ultraviolet light UV is irradiated onto the second region A2 of the photoalignment layer 440 exposed by the mask 600 and thereby causes the photopolymerization reaction of second photoreactors 443b protruding from the base layer 441 in the second direction.

Therefore, the second alignment layer PI2 includes the double-layer structure and the photoalignment layer 440 is formed to have a substantially reduced thickness. Thus, the total quantity of the photoreactors 143, which are a cause of the charging of the DC voltage, is substantially decreased to thereby effectively prevent afterimages caused by the charging of the DC voltage.

Hereinafter, a method of manufacturing an LCD device in accordance with an alternative exemplary embodiment of the present invention will be described in further detail with reference to the FIGS. 4 to 6C.

Referring to FIGS. 5A to 5E, the first substrate 300 is formed. The first substrate 300 includes the pixel areas, and further includes the first TFT TR1 and the second TFT TR2, the pixel electrode 370 disposed on the first TFT TR1 and the second TFT TR2, and the first alignment layer PI1 disposed on the pixel electrode 370.

Referring to FIGS. 6A and 6B, the second substrate 400 is then formed. The second substrate 400 includes the common electrode 420 facing the pixel electrode 370 of the first substrate 300 and a second alignment layer PI2 disposed on the common electrode 420. The first alignment layer PI1 and the second alignment layer PI2 include a double-layer structure having the insulation layer 130 and the photoalignment layer 140. The method of manufacturing the first alignment layer PI1 according to an exemplary embodiment is substantially the same as in greater detail above with reference to FIGS. 5B to 5E, and the method of manufacturing the second alignment layer PI2 is substantially the same as described in greater detail above with reference to FIGS. 6B and 6C. Thus, any repetitive detailed description will hereinafter be omitted.

When the first substrate 300 and the second substrate 400 are manufactured, the first substrate 300 and the second substrate 400 are coupled together. The liquid crystal layer 500 is disposed between the first substrate 300 and the second substrate 400 such as shown in FIG. 4, to manufacture the LCD device according to an exemplary embodiment.

Figure 7:
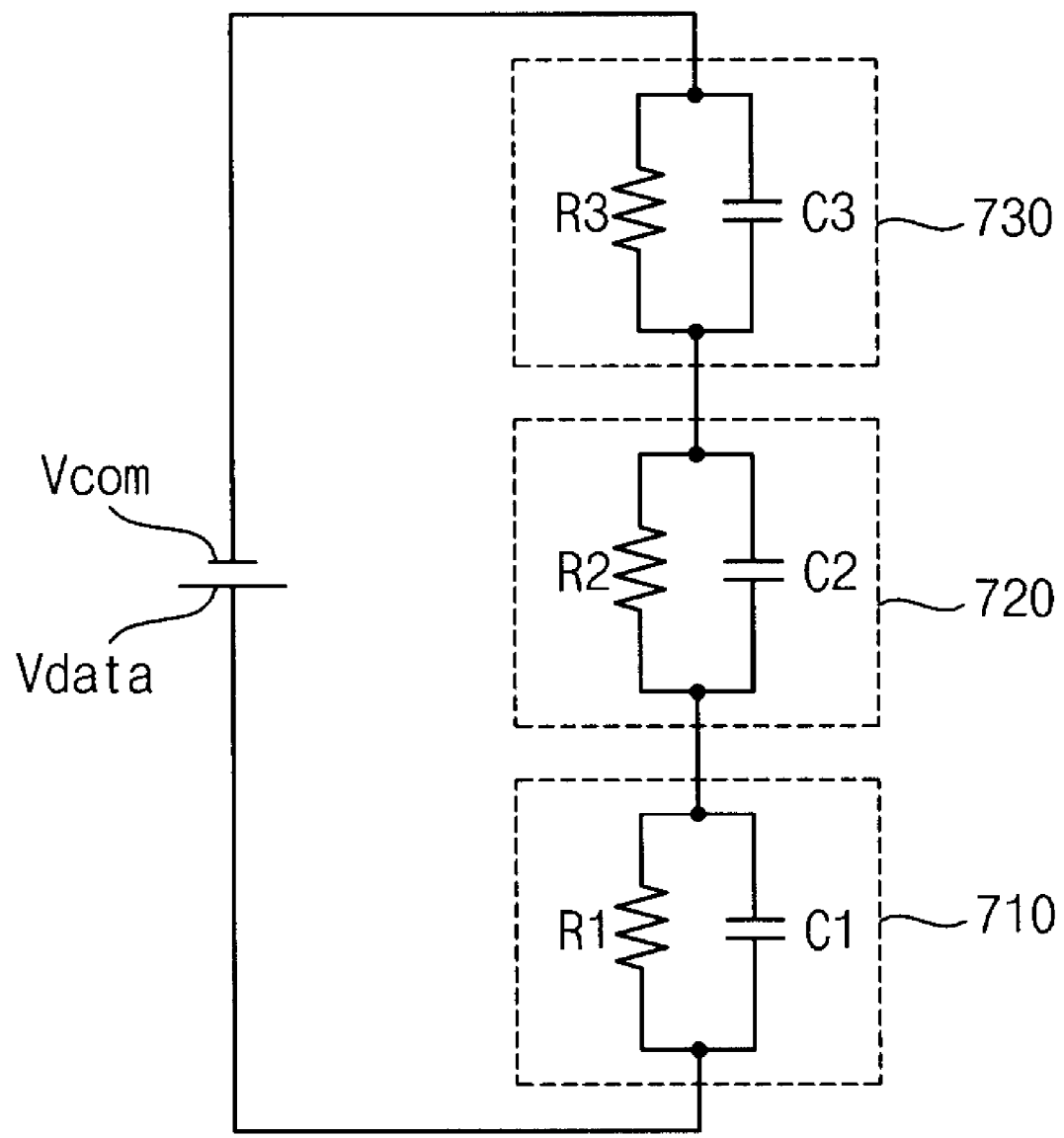
FIG. 7 is a schematic circuit diagram of an exemplary embodiment of an LCD device according to the present invention.

FIG. 7 is a schematic circuit diagram of an exemplary embodiment of an LCD device according to the present invention.

Referring to FIGS. 4 and 7, the LCD device according to an exemplary embodiment includes a first resistor-capacitor ("RC") parallel circuit 710, a second RC parallel circuit 720 and a third RC parallel circuit 730. The first RC parallel circuit 710, the second RC parallel circuit 720 and the third RC parallel circuit 730 are all connected in series between the pixel electrode 370 and the common electrode 420. Moreover, the first RC parallel circuit 710, corresponding to the first alignment layer PI1, includes a first resistor R1 and a first capacitor C1. The second parallel circuit 720, corresponding to the liquid crystal layer 500, includes a second resistor R2 and a second capacitor C2. The third parallel circuit 730, corresponding to the second alignment layer PI2, includes a third resistor R3 and a third capacitor C3.

In an LCD device wherein the first alignment layer PI1 and the second alignment layer PI2 include a single-layer structure having a thickness of about 0.9 μm, each of the first resistor R1 and the third resistor R3 had values of about 8.5E+07Ω, while each of the first capacitor C1 and the third capacitor C3 were about 3.8E-05 F.

Hereinafter, resistances and capacitances of the alignment layer 150 having a double-layer structure, e.g., include the insulation layer 130 and the photoalignment layer 140 were measured for various changes in a thickness of the insulation layer 130 and the photoalignment layer 140.

More specifically, an alignment layer according to an exemplary embodiment having the double-layer structure having an insulation layer IL and a photoalignment layer PAL had properties listed in Table 1.

TABLE 1

|  | Dielectric Constant | Specific Resistance (Ω) | Thickness (μm) | Resistance (Ω) | Capacitance (F) |
|---|---|---|---|---|---|
| PAL | 4.1 | 1.20E+13 | 0.9 | 1.08E+07 | 4.03E-05 |
| IL | 4.5 | 1.00E+14 | 0.9 | 9.00E+07 | 4.43E-05 |

Referring to Table 1, when the photoalignment layer has a thickness of about 0.9 μm, the dielectric constant is about 4.1, the specific resistance is about 1.20E+13Ω, the resistance is 1.08E+07Ω and the capacitance is about 4.03E-05 F. When the insulation layer has a thickness of about 0.9 μm, the dielectric constant is about 4.5, the specific resistance is about 1.000E+14Ω, the resistance is 9.00E+07Ω and the capacitance is about 4.43E-05 F.

The resistance of the alignment layer having the double-layer structure was then measured for changes in the thickness of the insulation layer IL and the photoalignment layer PAL. The resistances of the alignment layer corresponding to changes in the thicknesses are shown in Table 2.

TABLE 2

| | Resistance (Ω) | | | |
|---|---|---|---|---|
| | PAL | | | |
| IL | 100 (Å) | 200 (Å) | 300 (Å) | 400 (Å) |
| 0 | 1.0E+07 | 2.0E+07 | 3.0E+07 | 4.0E+07 |
| 100 (Å) | 2.0E+07 | 3.0E+07 | 4.0E+07 | 5.0E+07 |
| 200 (Å) | 3.0E+07 | 4.0E+07 | 5.0E+07 | 6.0E+07 |
| 300 (Å) | 4.0E+07 | 5.0E+07 | 6.0E+07 | 7.0E+07 |
| 400 (Å) | 5.0E+07 | 6.0E+07 | 7.0E+07 | 8.0E+07 |
| 500 (Å) | 6.0E+07 | 7.0E+07 | 8.0E+07 | 9.0E+07 |
| 600 (Å) | 7.0E+07 | 8.0E+07 | 9.0E+07 | 1.0E+08 |
| 700 (Å) | 8.0E+07 | 9.0E+07 | 1.0E+08 | 1.1E+08 |
| 800 (Å) | 9.0E+07 | 1.0E+08 | 1.1E+08 | 1.2E+08 |
| 900 (Å) | 1.0E+08 | 1.1E+08 | 1.2E+08 | 1.3E+08 |

Referring to Table 2, when the thickness of the photoalignment layer was about 100 Å and the thickness of the insulation layer was about 700 Å, for example, the resistance of the alignment layer was about 8.0E+07Ω. Thus, the resistance of the alignment layer was substantially the same as the resistance of about 8.5E+07Ω of the alignment layer of the single-layer structure. When the thickness of the photoalignment layer was about 200 Å and the thickness of the insulation layer was about 600 Å, the thickness of the photoalignment layer was about 300 Å and the thickness of the insulation layer was about 500 Å, and the thickness of the photoalignment layer was about 400 Å and the thickness of the insulation layer was about 400 Å, the resistance of the alignment layer was substantially the same as the resistance of about 8.0E+07Ω of the alignment layer of the single-layer structure.

The capacitance of the alignment layer having the double-layer structure was measured in accordance with changes in the thickness of the insulation layer IL and the photoalignment layer PAL. The capacitance of the alignment layer in accordance with the changes in the thickness is shown in Table 3.

TABLE 3

| | Capacitance (F) | | | |
|---|---|---|---|---|
| | PAL | | | |
| IL | 100 (Å) | 200 (Å) | 300 (Å) | 400 (Å) |
| 0 | 3.5E-04 | 1.7E-04 | 1.2E-04 | 8.6E-05 |
| 100 (Å) | 1.8E-04 | 1.2E-04 | 8.9E-05 | 7.1E-05 |
| 200 (Å) | 1.3E-04 | 9.2E-05 | 7.3E-05 | 6.0E-05 |
| 300 (Å) | 9.6E-05 | 7.5E-05 | 6.2E-05 | 5.2E-05 |
| 400 (Å) | 7.7E-05 | 6.3E-05 | 5.3E-05 | 4.6E-05 |
| 500 (Å) | 6.5E-05 | 5.5E-05 | 4.7E-05 | 4.1E-05 |
| 600 (Å) | 5.6E-05 | 4.8E-05 | 4.2E-05 | 3.8E-05 |
| 700 (Å) | 4.9E-05 | 4.3E-05 | 3.8E-05 | 3.4E-05 |
| 800 (Å) | 4.4E-05 | 3.9E-05 | 3.5E-05 | 3.2E-05 |
| 900 (Å) | 3.9E-05 | 3.5E-05 | 3.2E-05 | 2.9E-05 |

Referring to Table 3, when the thickness of the photoalignment layer was about 100 Å and the thickness of the insulation layer was about 900 Å, the capacitance of the alignment layer was 3.9E-05 F that was the similar to the capacitance of about 3.8E-05 F of the alignment layer of the single-layer structure. When the thickness of the photoalignment layer was about 200 Å and the thickness of the insulation layer was about 800 Å, the capacitance of the alignment layer was about 3.9E-05 F. e.g., similar to the capacitance of about 3.8E-05 F of the alignment layer of the single-layer structure. When the thickness of the photoalignment layer was about 300 Å and the thickness of the insulation layer was about 700 Å, and the thickness of the photoalignment layer was about 400 Å and the thickness of the insulation layer was about 600 Å, the capacitance of the alignment layer was about 3.8E-05 F. e.g., substantially the same as the capacitance of about 3.8E-05 F of the alignment layer of the single-layer structure.

Therefore, in order for the alignment layer having the double-layer structure to have a thickness, resistance and capacitance that are similar to those of the alignment layer having the single-layer structure, ratios of the thickness of the photoalignment layer to the insulation layer were about 100 Å:800 Å, 200 Å:700 Å, 300 Å:600 Å, and 400 Å:500 Å.

According to exemplary embodiments of the present invention as described herein, an alignment layer includes a double-layer structure having an insulation layer and a photoalignment layer. As a result, a photoalignment layer has a substantially reduced thickness. Thus, a quantity of photoreactors, which are a cause of charging of a DC voltage, is substantially decreased. Therefore afterimages caused by the charging of the DC voltage are substantially reduced and/or effectively prevented.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal display device comprising:
a first substrate including a thin-film transistor and a plurality of pixel areas disposed on the first substrate;
a pixel electrode disposed on the thin-film transistor;
a second substrate disposed opposite to the first substrate;
a liquid crystal layer disposed intermediate the first and second substrates;
a common electrode disposed on the second substrate; and
an alignment layer including an insulation layer and a photoalignment layer disposed on at least one of the pixel electrode and the common electrode,
wherein the photoalignment layer is disposed intermediate the insulation layer and the liquid crystal layer, and the photoalignment layer includes a base layer in contact with the insulation layer and a photoreactor protruding from the base layer.

2. The liquid crystal display device of claim 1, wherein a thickness of the photoalignment layer is less than a thickness of the insulation layer.

3. The liquid crystal display device of claim 1, wherein
the photoalignment layer includes a plurality of photoreactors,
photoreactors of the plurality of photoreactors protrude in different directions from each other, and
each pixel area of the plurality of pixel areas is divided into a multi-domain structure by the photoreactors protruding in the different directions.

4. The liquid crystal display device of claim 1, wherein the thin-film transistor is connected to a gate line and a data line, the data line extending in a direction substantially crossing the gate line.

5. The liquid crystal display device of claim 1, further comprising a color filter disposed between the second substrate and the common electrode.

6. The liquid crystal display device of claim 1, wherein the photoalignment layer includes a polymer material comprising polyimide, polyamic acid, polyvinyl cinnamate, polyazobenzene, polyethyleneimine, polyvinyl alcohol, polyamide, polyethylene, polystyrene, polyphenylene phthalamide, polyester, polyurethane and/or polymethyl methacrylate.

7. A method of manufacturing a liquid crystal display panel, the method comprising:
forming a first substrate including a thin-film transistor and a pixel electrode disposed on the thin-film transistor and a plurality of pixel areas disposed on the first substrate;
forming a second substrate opposite to the pixel electrode of the first substrate, the second substrate including a common electrode;
forming a liquid crystal layer intermediate the first and second substrates; and
forming an alignment layer on at least one of the pixel electrode and the common electrode, the alignment layer including an insulation layer and a photoalignment layer,
wherein the photoalignment layer is disposed intermediate the insulation layer and the liquid crystal layer, and the photoalignment layer includes a base layer in contact with the insulation layer and a photoreactor protruding from the base layer.

8. The method of claim 7, wherein a thickness of the photoalignment layer is less than a thickness of the insulation layer.

9. The method of claim 7, wherein the forming the alignment layer comprises:
forming the insulation layer on the first substrate having the pixel electrode formed thereon;
forming the photoalignment layer on the first substrate having the insulation layer formed thereon; and
irradiating light onto the photoalignment layer so that a base layer is formed on the insulation layer and photoreactors protruding from the base layer are formed.

10. The method of claim 9, wherein the forming the first substrate comprises:
forming a gate metal pattern including a gate line and a gate electrode on the first substrate;
forming a gate insulation layer on the first substrate having the gate metal pattern formed thereon;
forming a source metal pattern including a data line extending in a direction substantially crossing the gate line, a source electrode connected to the data line and a drain electrode spaced apart from the source electrode on the first substrate having the gate insulation layer formed thereon; and
forming a protective layer on the first substrate having the source metal pattern formed thereon.

11. The method of claim 10, wherein the pixel electrode contacts the drain electrode through a contact hole formed through the protective layer.

12. The method of claim 10, wherein the irradiating the light onto the photoalignment layer comprises:
irradiating the light in different directions corresponding to respective domains of a multi-domain structure of pixel areas of the plurality of pixel areas to form the photoreactors having the different directions, the pixel areas being divided into the multi-domain structure.

13. The method of claim 9, wherein the forming the second substrate includes forming a color filter on the second substrate.

14. The method of claim 13, wherein the forming the alignment layer comprises:
forming an insulation layer on the second substrate having the common electrode formed thereon;
forming a photoalignment layer on the second substrate having the insulation layer formed thereon; and
irradiating light to the photoalignment layer so that a base layer, formed on the insulation layer, and the photoreactors, protruding from the base layer, are formed.

15. The method of claim 14, wherein the irradiating the light onto the photoalignment layer comprises:
irradiating the light in different directions corresponding to respective domains of a multi-domain structure of pixel areas of the plurality of pixel areas to form the photoreactors having the different directions, the pixel areas being divided into the multi-domain structure.

16. The method of claim 7, wherein the photoalignment layer includes a polymer material comprising polyimide, polyamic acid, polyvinyl cinnamate, polyazobenzene, polyethyleneimine, polyvinyl alcohol, polyamide, polyethylene, polystyrene, polyphenylene phthalamide, polyester, polyurethane and/or polymethyl methacrylate.

17. A liquid crystal display device comprising:
a first substrate including a thin-film transistor, a pixel electrode electrically connected to the thin-film transistor and a first alignment layer comprising an insulation layer disposed on the pixel electrode and a photoalignment layer having a thickness less than a thickness of the insulation layer;
a second substrate including a common electrode disposed opposite to the pixel electrode and a second alignment layer comprising an insulation layer disposed on the common electrode and a photoalignment layer having a thickness less than the thickness of the insulation layer; and a liquid crystal layer disposed between the first substrate and the second substrate, the liquid crystal layer including liquid crystal molecules, wherein alignment directions of the liquid crystal molecules are determined by the first alignment layer and the second alignment layer;

wherein the photoalignment layer of either the first and second alignment layers is disposed intermediate the respective insulation layer and the liquid crystal layer, and the photoalignment layer includes a base layer in contact with the insulation layer and a photoreactor protruding from the base layer.

18. The liquid crystal display device of claim 17, wherein the first alignment layer and the second alignment layer include photoreactors protruding therefrom in different directions.

19. The liquid crystal display device of claim 17, wherein the photoalignment layer includes a polymer material comprising polyimide, polyamic acid, polyvinyl cinnamate, polyazobenzene, polyethyleneimine, polyvinyl alcohol, polyamide, polyethylene, polystyrene, polyphenylene phthalamide, polyester, polyurethane and/or polymethyl methacrylate.

* * * * *